US012729629B2

United States Patent
(12) United States Patent
Lauwick et al.

(10) Patent No.: US 12,729,629 B2
(45) Date of Patent: Sep. 8, 2026

(54) TURBINE ENGINE MOTOR HAVING AN UNDUCTED FAN

(71) Applicant: SAFRAN AIRCRAFT ENGINES, Paris (FR)

(72) Inventors: Lucas Antoine Christophe Lauwick, Moissy-Cramayel (FR); Celia Iglesias Cano, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/857,152

(22) PCT Filed: Apr. 6, 2023

(86) PCT No.: PCT/FR2023/050498
§ 371 (c)(1),
(2) Date: Jun. 5, 2025

(87) PCT Pub. No.: WO2023/198979
PCT Pub. Date: Oct. 19, 2023

(65) Prior Publication Data

US 2025/0369365 A1 Dec. 4, 2025

(30) Foreign Application Priority Data

Apr. 15, 2022 (FR) ....................................... 2203562

(51) Int. Cl.
*F01D 5/28* (2006.01)
*F01D 9/04* (2006.01)

(52) U.S. Cl.
CPC ............. *F01D 9/042* (2013.01); *F01D 5/282* (2013.01); *F05D 2240/12* (2013.01);
(Continued)

(58) Field of Classification Search
CPC ...... F01D 9/042; F01D 5/282; F05D 2240/12; F05D 2250/75; F05D 2260/31; F05D 2300/6034
See application file for complete search history.

(56) References Cited

U.S. PATENT DOCUMENTS 4,861,229 A * 8/1989 Halstead ................. F01D 9/042
415/138
2004/0013519 A1 * 1/2004 Correia ................... F01D 9/042
415/189

(Continued)

FOREIGN PATENT DOCUMENTS

| | | | |
|---|---|---|---|
| EP | 0466602 | A1 | 1/1992 |
| FR | 3107300 | A1 | 8/2021 |
| WO | 2014076407 | A1 | 5/2014 |

OTHER PUBLICATIONS

International Search Report mailed Jun. 29, 2023, issued in corresponding International Application No. PCT/FR2023/050498, filed Apr. 6, 2023, 7 pages.

(Continued)

*Primary Examiner* — Nathaniel E Wiehe
*Assistant Examiner* — Theodore C Ribadeneyra
(74) *Attorney, Agent, or Firm* — Christensen O'Connor Johnson Kindness PLLC

(57) ABSTRACT

A turbine engine motor having an unducted fan and a plurality of guide vanes, each guide vane being made of composite materials configured to be fixed to at least one inner fixed structure of a turbine engine, each guide vane including an aerodynamic blade extending radially outwards along a radial axis, an outer radial end, and an inner radial end. Each guide vane can have an inner platform configured to be fixed to the inner fixed structure and connected to the inner radial end by an inner connecting elbow and extending
(Continued)

from the inner radial end along a single first tangential direction, secant to the radial axis of the aerodynamic blade.

4 Claims, 3 Drawing Sheets

(52) U.S. Cl.
CPC ...... *F05D 2250/75* (2013.01); *F05D 2260/31* (2013.01); *F05D 2300/6034* (2013.01)

(56) References Cited

U.S. PATENT DOCUMENTS

| | | | | |
|---|---|---|---|---|
| 2009/0208332 | A1* | 8/2009 | Weinstein | F01D 25/246 415/209.3 |
| 2013/0052004 | A1* | 2/2013 | Stilin | F01D 9/042 415/211.2 |
| 2017/0167502 | A1* | 6/2017 | Anderson | F01D 5/3023 |
| 2018/0080478 | A1 | 3/2018 | Langenbrunner et al. | |
| 2019/0120071 | A1 | 4/2019 | Zaccardi et al. | |

OTHER PUBLICATIONS

Written Opinion mailed Jun. 29, 2023, issued in corresponding International Application No. PCT/FR2023/050498, filed Apr. 6, 2023, 11 pages.

* cited by examiner

[Fig. 1]
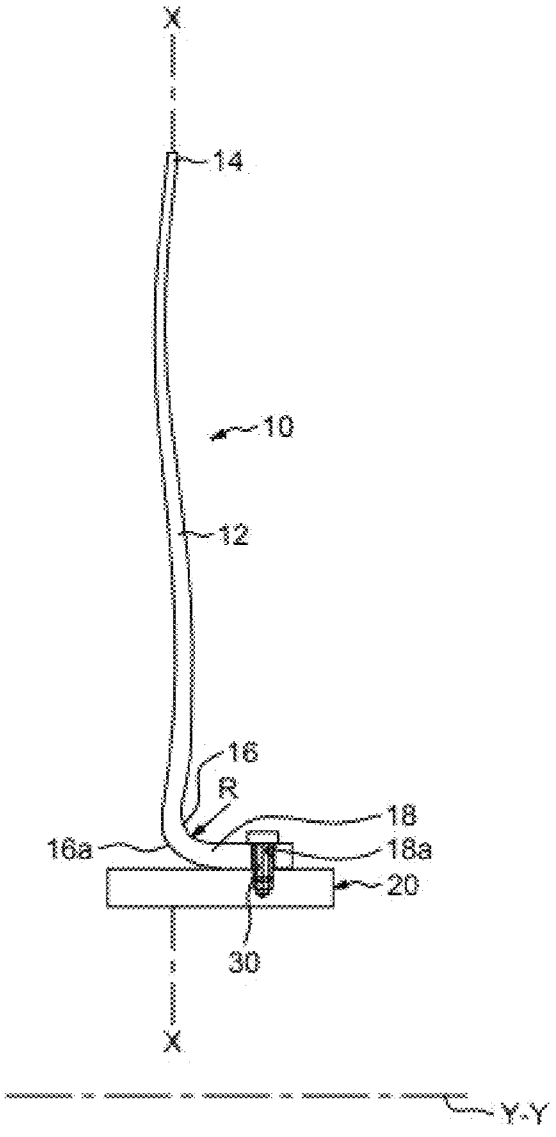

[Fig. 2]
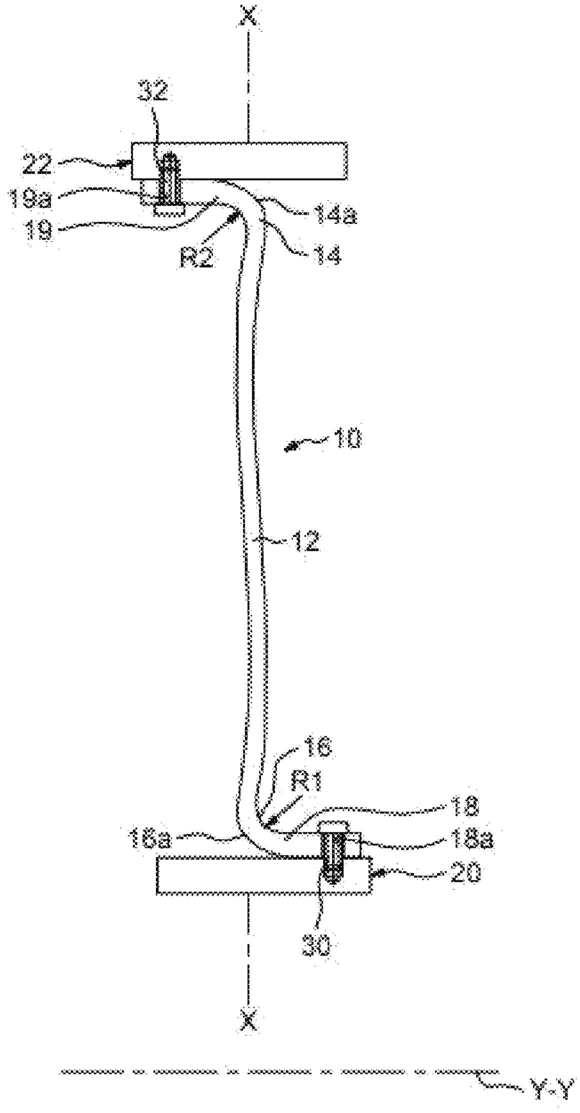

[Fig. 3]
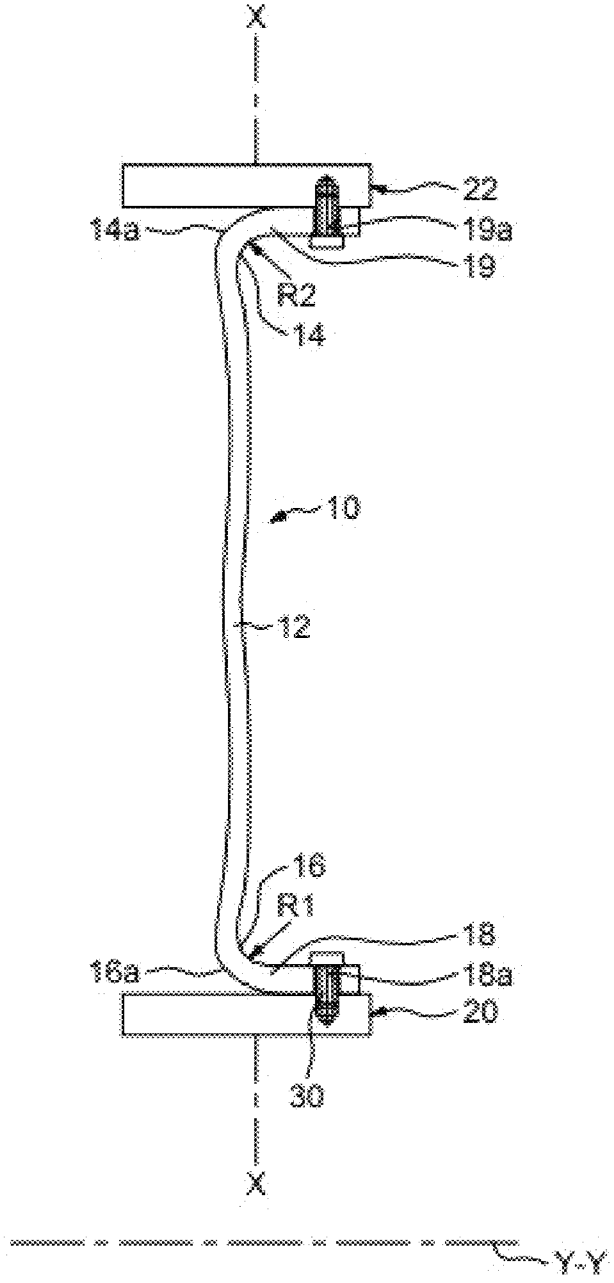

TURBINE ENGINE MOTOR HAVING AN UNDUCTED FAN

CROSS-REFERENCE TO RELATED APPLICATIONS

This application is a National Stage of International Application No. PCT/FR2023/050498, filed Apr. 6, 2023, which claims priority to French Patent Application No. 2203562, filed Apr. 15, 2022, the entire disclosures of which are hereby incorporated by reference in their entirety for all purposes.

TECHNICAL FIELD

Embodiments of the disclosure relate to the field of turbine engines, and in particular flow guides or stationary vane assemblies in compressors or a turbine engine turbine.

More specifically, embodiments of the disclosure relate to guide vanes, in particular outlet guide vanes or OGV for short.

BACKGROUND

Aircraft turbine engines of the twin-spool turbofan engine type are conventionally known.

The main air flow is divided into a primary air flow and a secondary air flow by an air separator or nozzle located downstream of the fan. The primary air flow flows in the primary flow path, entering the low-pressure compressor at the inlet guide vanes or IGV for short. The secondary air flow is diverted by the separator nozzle into the secondary flow path in the direction of the outlet guide vanes or OGV for short, then towards the exit of the turbine engine. The separator nozzle is arranged upstream of the outlet guide vanes, on the upstream end of the inner platform of the outlet guide vane assembly.

If the low-pressure compressor can be likened to a fan, the main flow is divided downstream of the low-pressure compressor and the primary air flow flows in the primary flow path, entering the high-pressure compressor.

The separation of the main air flow by the separation nozzle creates a disturbance in the flows, which are then straightened by the inlet or outlet guide vanes respectively.

Turbine engines with ducted fans and turbine engines with “propfans” or “unducted fans”, known as “open rotor”, are known, in which the fan is not enclosed by an aerodynamic outer casing.

Typically, the guide vanes each comprise a blade and two platforms, one inner and one outer, arranged on the blade. The outer platform is then fixed to an outer fixed structure, such as an intermediate casing shroud and the inner platform is fixed to an inner fixed structure, such as a hub of the turbine engine. Each of the platforms extends tangentially symmetrically on either side of the blade.

In the case of a turbine engine with a propfan, only one of the platforms is fixed to the outer fixed structure.

It is known to use radial fasteners in the form of a plurality of radial flanges to fix each of the tangential portions of the platforms to one of the fixed structures of the turbine engine.

However, the use of radial flanges requires a large attachment surface at the platform of the guide vanes. Indeed, in order to have an adequate second moment of area and thus better absorption of the forces exerted on the vane, it is necessary for the areas where the guide vane is fixed to the fixed structure to be spaced apart from the blade of the vane, in a direction perpendicular to the blade.

It is also known to use a tangential fastener to fix the inner end of a guide vane without a platform. In this case, the stator comprises a fixing piece comprises two radial projections between which the inner end of a guide vane extends. However, although the tangential space requirement is limited here, the radial space requirement of such a solution is particularly large, which makes it harder to integrate into the turbine engine.

In recent turbine engines, large parts with vanes are generally made from organic matrix composites, which reduce the weight of the vanes while maintaining equivalent mechanical properties.

It is known to produce parts with vanes by three-dimensional weaving of a single densified preform.

The guide vanes made of composite materials are attached to metallic parts of the stator by the conventional fastening systems, by two radial flanges or by a tangential flange.

Thus, there is a need to improve the attachment of the guide vanes made of composite materials to metallic parts of the stator by limiting both the radial space requirement and the tangential space requirement.

SUMMARY

The aim of the present disclosure is therefore to overcome the aforementioned disadvantages.

The object of the disclosure is therefore to reduce the tangential space requirement of a fixing area for a guide vane made of composite materials.

An object of the disclosure is therefore a guide vane made of composite materials intended to be fixed to at least one inner fixed structure of a turbine engine.

The guide vane comprises an aerodynamic blade extending radially outwards along a radial axis, an outer radial end or vane tip and an inner radial end or vane root.

The guide vane comprises an inner platform designed to be fixed to the inner fixed structure and connected to the inner radial end by an inner connecting elbow or angle and extending from the inner radial end along a single first tangential direction, secant to the radial axis of the aerodynamic blade.

For example, the first tangential direction is perpendicular to the radial axis of the aerodynamic blade.

In other words, the inner platform only extends laterally relative to the blade on one side of the blade and does not extend beyond the blade on the other side of the blade.

The terms “inner” and “outer” are defined with respect to a direction radial to the axis of rotation of the turbine engine, the inside being closer to the axis of rotation than the outside.

“Elbow” or “angle” is understood to be a curved part joining the corresponding inner or outer platform to the corresponding inner or outer radial end.

In some embodiments, the aerodynamic blade and the inner platforms are made from a single one-piece component.

The inner platform comprises, for example, at least one opening or hole for receiving a radial fixing system, for example a bolt. Alternatively, it is possible to provide another type of fastener, for example a rivet for attachment to the inner fixed structure.

According to one embodiment, the guide vane comprises a reinforcement element, such as a reinforcement plate arranged radially between the inner platform and the inner fixed structure.

According to one embodiment, the thickness of the inner connecting elbow and/or inner platform is greater than the thickness of the blade.

Alternatively, the thickness of the inner connecting elbow and/or inner platform is less than the thickness of the blade. According to one embodiment, the inner platform includes a reinforcement woven in a different weave than that of the blade, in particular one that is stiffer.

According to another embodiment, the vane comprises an outer platform designed to be fixed to an outer fixed structure radially surrounding the inner fixed structure and connected to the outer radial end by an outer connecting elbow or angle.

According to one embodiment, the outer platform extends from the outer radial end along a single second tangential direction, secant to the radial axis of the aerodynamic blade, different from the first tangential direction.

For example, the second tangential direction is perpendicular to the radial axis of the aerodynamic blade.

For example, the inner platform and the outer platform extend in two substantially opposite tangential directions.

According to another embodiment, the outer platform extends from the outer radial end only along the first tangential direction, secant to the radial axis of the aerodynamic blade.

For example, the first tangential direction is perpendicular to the radial axis of the aerodynamic blade.

In other words, the inner platform and the outer platform extend in the same first tangential direction.

In some embodiments, the aerodynamic blade, the inner platform and the outer platform are made from a single one-piece component.

For example, the outer platform comprises an opening or hole for receiving a radial fixing system for attachment to the outer fixed structure, such as a bolt.

Alternatively, it is possible to provide another type of fastener, for example a rivet for attachment to the outer fixed structure.

For example, the vane comprises a reinforcement member such as a reinforcement plate arranged radially between the outer platform and the outer fixed structure.

For example, the thickness of the outer connecting elbow and/or outer platform is greater than the thickness of the blade. Alternatively, the thickness of the inner connecting elbow and/or inner platform is less than the thickness of the blade.

For example, the outer platform comprises a reinforcement woven in a different weave than that of the blade, in particular one that is stiffer.

According to another aspect, embodiments of the disclosure relate to a turbine engine motor with a propfan or unducted fan comprising a plurality of vanes as described above.

According to another aspect, embodiments of the disclosure relate to a turbine engine motor with a ducted fan comprising a coaxial inner fixed structure and outer fixed structure and a plurality of vanes as described above.

DESCRIPTION OF THE DRAWINGS

Further aims, features and advantages of the disclosure will become apparent from reading the following description, provided solely by way of non-limiting example, with reference to the accompanying drawings in which:

FIG. 1 schematically shows a guide vane made of composite materials according to one embodiment of the disclosure, viewed in the axial direction, corresponding to the direction of flow of the fluids in the turbine engine, fixed to an inner fixed structure of a turbine engine with a propfan;

FIG. 2 schematically shows a guide vane made of composite materials according to another embodiment of the disclosure, viewed in the axial direction, fixed to an inner fixed structure and an outer fixed structure of a turbine engine with a ducted fan; and FIG. 3 schematically shows a guide vane made of composite materials according to another embodiment of the disclosure, viewed in the axial direction, fixed to an inner fixed structure and an outer fixed structure of a turbine engine with a ducted fan.

In the rest of the description, the terms "upstream" and "downstream" are defined with respect to the direction of air flow in the turbine engine. The terms "inner" and "outer" are defined with respect to a direction radial to the axis of rotation Y-Y of the turbine engine, the inside being closer to the axis of rotation Y-Y than the outside.

DETAILED DESCRIPTION

FIG. 1 shows in a highly schematic manner a view of a guide vane 10 made of composite materials fixed to an inner fixed structure 20, for example a metallic part of a hub of a turbine engine (not shown) with an unducted fan, and in particular an aircraft turbojet. The turbine engine will not be elaborated on in the rest of the description.

The guide vane 10 comprises an aerodynamic blade 12 extending radially outwards along a radial axis X-X, an outer radial end or vane tip 14 and an inner radial end 16 or vane root.

The guide vane 10 also comprises an inner platform 18 connected to the vane root 16 by an inner connecting elbow or angle **16*a***.

As shown in FIG. 1, the inner platform 18 extends here tangentially from the vane root 16 along a single first tangential direction, in this case perpendicular to the radial axis X-X of the aerodynamic blade 12. In other words, the inner platform 18 only extends on one side of the blade.

Generally speaking, the inner platform 18 extends tangentially from the vane root 16 along a single first tangential direction secant to the radial axis X-X of the aerodynamic blade 12.

The vane shown in FIG. 1 is generally L-shaped.

The aerodynamic blade 12 and the inner platform 18 are made from a single one-piece component.

The inner platform 18 comprises a hole **18*a* for receiving a radial fixing system 30**, in this case a bolt. Alternatively, it is possible to provide another type of fastener, for example a rivet.

A reinforcement element could also be inserted, such as a reinforcement plate arranged radially between the inner platform 18 and the metallic part 20.

The guide vane 10 is, for example, produced by three-dimensional weaving of a single densified preform.

A thickness of the inner connecting elbow **16*a* at its radius of curvature R could be greater than the thickness of the blade 12**.

A thickness of the inner platform 18 could also be greater than the thickness of the blade 12.

The inner platform 18 and possibly the connection area **16*a* to the blade 12** could also comprise a textile reinforcement (not shown) woven in a different weave than that of the blade, in particular one that is stiffer.

The embodiment shown in FIG. 2, in which the same elements have the same reference numerals, only differs from the embodiment shown in FIG. 1 in that the guide vane 10 made of composite materials is fixed to a coaxial inner fixed structure 20 and outer fixed structure 22 of a turbine engine (not shown) with a ducted fan. The turbine engine will not be elaborated on in the rest of the description.

As shown in FIG. 2, the guide vane 10 comprises an aerodynamic blade 12 extending radially outwards along a radial axis X-X, an outer radial end or vane tip 14 and an inner radial end 16 or vane root.

The guide vane 10 also comprises an inner platform 18 connected to the vane root 16 by an inner connecting elbow or angle 16*a* and an outer platform 19 connected to the vane tip 14 by an outer connecting elbow or angle 14*a*.

As shown in FIG. 2, the inner platform 18 extends from the vane root 16 along a single first tangential direction, secant to the radial axis X-X of the aerodynamic blade 12 and the outer platform 19 extends from the vane tip 14 along a single second tangential direction, secant to the radial axis X-X of the aerodynamic blade 12. In this case, the first tangential direction is different from the second tangential direction.

The first and second tangential directions are, for example, perpendicular to the radial axis X-X.

In other words, the inner platform 18 only extends on one side of the blade in the first tangential direction and the outer platform 19 only extends on another side of the blade in the second tangential direction.

As shown in FIG. 2, the inner platform 18 and the outer platform 19 extend in two substantially opposite tangential directions.

The vane shown in FIG. 2 has a Z-shape.

The aerodynamic blade 12, the inner platform 18 and the outer platform 19 are made from a single one-piece component.

The inner platform 18 comprises a hole 18*a* for receiving another type of fastener, for example a rivet.

A reinforcement element could also be inserted, such as a reinforcement plate between the inner platform 18 and the outer fixed structure 22.

The outer platform comprises a hole 19*a* for receiving a radial fixing system 32, in this case a bolt. Alternatively, it is possible to provide another type of fastener, for example a rivet.

A reinforcement element could also be inserted, such as a reinforcement plate between the outer platform 19 and the outer fixed structure 22.

The guide vane 10 is, for example, produced by three-dimensional weaving of a single densified preform.

A thickness of the inner connecting elbow 16*a* at its radius of curvature R1 could be greater than the thickness of the blade 12, and a thickness of the outer connecting elbow 14*a* at its radius of curvature R2 could be greater than the thickness of the blade 12.

A thickness of the inner platform 18 and/or outer platform 19 could also be greater than the thickness of the blade 12.

It could also be provided that the inner platform 18 and/or the outer platform 19, and possibly their respective connection areas 16*a* and 14*a* to the blade 12 comprise a textile reinforcement (not shown) woven in a different weave than that of the blade, in particular one that is stiffer.

The embodiment shown in FIG. 3, in which the same elements have the same reference numerals, only differs from the embodiment shown in FIG. 2 in that the inner platform 18 and the outer platform 19 extend in the same tangential direction secant to the radial axis X-X of the blade 12, for example perpendicular to the radial axis.

As shown in FIG. 3, the guide vane 10 comprises an aerodynamic blade 12 extending radially outwards along the radial axis X-X, an outer radial end or vane tip 14 and an inner radial end 16 or vane root.

The guide vane 10 also comprises an inner platform 18 connected to the vane root 16 by an inner connecting elbow or angle 16*a* and an outer platform 19 connected to the blade tip 14 by an outer connecting elbow or angle 14*a*.

As shown in FIG. 2, the inner platform 18 extends from the vane root 16 along a single first tangential direction, secant to the radial axis X-X of the aerodynamic blade 12 and the outer platform 19 extends from the vane tip 14 along the single first tangential direction, secant to the radial axis X-X of the aerodynamic blade 12.

In other words, the inner platform 18 only extends on one side of the blade and the outer platform 19 only extends on the same side of the blade.

As shown in FIG. 3, the inner platform 18 and the outer platform 19 extend in the same first tangential direction, secant to the radial axis X-X, for example perpendicular.

The vane shown in FIG. 3 has a C-shape.

The aerodynamic blade 12, the inner platform 18 and the outer platform 19 are made from a single one-piece component.

The inner platform 18 comprises a hole 18*a* for receiving a radial fixing system 30, in this case a bolt. Alternatively, it is possible to provide another type of fastener, for example a rivet.

A reinforcement element could also be inserted, such as a reinforcement plate between the inner platform 18 and the outer fixed structure 22.

The outer platform comprises a hole 19*a* for receiving a radial fixing system 32, in this case a bolt. Alternatively, it is possible to provide another type of fastener, for example a rivet.

A reinforcement element could also be inserted, such as a reinforcement plate between the outer platform 19 and the outer fixed structure 22.

The guide vane 10 is, for example, produced by three-dimensional weaving of a single densified preform.

A thickness of the inner connecting elbow 16*a* at its radius of curvature R1 could be greater than the thickness of the blade 12, and a thickness of the outer connecting elbow 14*a* at its radius of curvature R2 could be greater than the thickness of the blade 12.

A thickness of the inner platform 18 and/or outer platform 19 could also be greater than the thickness of the blade 12.

The inner platform 18 and/or the outer platform 19 could also comprise a textile reinforcement (not shown) woven in a different weave than that of the blade, in particular one that is stiffer.

The disclosure significantly reduces the tangential space requirement of the area where the guide vane is fixed to the fixed structures of the turbine engine. Moreover, the process of manufacturing the guide vane made of composite materials is also simplified by eliminating one of the side platforms and thus simplifying the weave in the fixing area.

Improvements over the current art are expected when the woven preform is prepared and shaped in the injection mold, in accordance with embodiments of the present disclosure.

The invention claimed is:

1. A turbine engine motor having a propfan, the turbine engine motor comprising:

a plurality of guide vanes made of composite materials, each guide vane comprising:

an aerodynamic blade extending radially outwards along a radial axis, the aerodynamic blade having an outer radial end and an inner radial end; and an inner platform configured to be fixed to the inner fixed structure and connected to the inner radial end by an inner connecting elbow and extending from the inner radial end along a single first tangential direction, secant to the radial axis of the aerodynamic blade, the inner platform comprising an opening for receiving a radial fixing system for independently fixing each of the vanes to the inner fixed structure; and a reinforcement element arranged radially between the inner platform of each of the vanes and the inner fixed structure, wherein each of the guide vanes are fixed only to an inner fixed structure of the turbine engine motor.

2. The turbine engine motor according to claim 1, wherein the aerodynamic blade and the inner platform are made from a single one-piece component.

3. The turbine engine motor according to claim 1, wherein the thickness of the inner connecting elbow and/or inner platform is greater than the thickness of the aerodynamic blade.

4. The turbine engine motor according to claim 1, wherein the inner platform comprises a reinforcement woven in a different weave from a weave of the aerodynamic blade.

* * * * *